(12) United States Patent
Picard

(10) Patent No.: US 8,693,496 B2
(45) Date of Patent: Apr. 8, 2014

(54) DIODE BRIDGE CONFIGURATIONS FOR INCREASING CURRENT IN A DISTRIBUTED POWER NETWORK

(75) Inventor: Jean Picard, Hooksett, NH (US)

(73) Assignee: Texas Instruments Incorporated, Dallas, TX (US)

( * ) Notice: Subject to any disclaimer, the term of this patent is extended or adjusted under 35 U.S.C. 154(b) by 1967 days.

(21) Appl. No.: 11/657,151

(22) Filed: Jan. 24, 2007

(65) Prior Publication Data

US 2007/0177411 A1 Aug. 2, 2007

Related U.S. Application Data

(60) Provisional application No. 60/762,668, filed on Jan. 27, 2006, provisional application No. 60/776,624, filed on Feb. 23, 2006.

(51) Int. Cl.
*H04L 12/66* (2006.01)
(52) U.S. Cl.
USPC ............................................. 370/463; 307/4
(58) Field of Classification Search
USPC .................. 363/17; 455/402; 307/4; 370/463
See application file for complete search history.

(56) References Cited

U.S. PATENT DOCUMENTS

| | | | |
|---|---|---|---|
| 2003/0107269 A1* | 6/2003 | Jetzt | 307/4 |
| 2005/0078700 A1 | 4/2005 | Thompson et al. | |
| 2006/0019629 A1* | 1/2006 | Berson et al. | 455/402 |
| 2006/0082220 A1* | 4/2006 | Karam et al. | 307/4 |
| 2006/0215680 A1 | 9/2006 | Camagna | |
| 2006/0218418 A1 | 9/2006 | Camagna et al. | |
| 2006/0218421 A1 | 9/2006 | Camagna et al. | |
| 2006/0238250 A1 | 10/2006 | Camagna et al. | |
| 2006/0273661 A1 | 12/2006 | Toebes et al. | |

* cited by examiner

*Primary Examiner* — Dang Ton
*Assistant Examiner* — Lionel Preval
(74) *Attorney, Agent, or Firm* — William B. Kempler; Wade J. Brady, III; Frederick J. Telecky, Jr.

(57) ABSTRACT

One embodiment of the present invention includes a communication network comprises a communication cable having a first wire pair and a second wire pair that both extend between a first end and a second end of the communication cable. The network also comprises at least one power source configured to provide a first supply current through the first wire pair and a second supply current through the second wire pair at the first end of the communication cable. The first supply current and the second supply current can be substantially equal. The network also comprises a first diode bridge and a second diode bridge coupled to the second end of the communication cable and configured to combine the first and second supply currents to provide a combined supply current. The network further comprises a powered device configured to receive the combined supply current.

22 Claims, 3 Drawing Sheets

DIODE BRIDGE CONFIGURATIONS FOR INCREASING CURRENT IN A DISTRIBUTED POWER NETWORK

RELATED APPLICATIONS

The present invention claims priority from U.S. Provisional Patent Application No. 60/762,668, filed Jan. 27, 2006 and U.S. Provisional Patent Application No. 60/776,624, filed Feb. 23, 2006.

TECHNICAL FIELD

This invention relates to electronic circuits, and more specifically to diode bridge configurations for increasing current in a distributed power network.

BACKGROUND

The demand for communications systems, such as networking and/or wireless solutions, is constantly increasing. As a result, the scope of networks (LAN or WAN) can be increased to include a variety of devices, such as a camera system, a wireless interface, an RFID reader, and/or a variety of other devices. The devices that connect to a network may require power in order to operate. Such power can come from, for example, batteries or from being plugged into a standard wall outlet to receive AC power. However, batteries have only a limited operating life before they must be recharged or replaced. In addition, power that is provided from an AC power outlet is typically converted to DC power by either an internal or external power supply. Such power conversion can include a substantial amount of additional circuitry that introduces additional cost, complexity, and occupied space.

One solution to providing power to components on an Ethernet network is power-over-Ethernet (PoE), which is governed in part by IEEE Standard 802.3 and other relevant standards. In PoE, both power and data are distributed over Ethernet cables between devices on the network. For example, a given device can include power sourcing equipment (PSE) that provides a current that is carried across an Ethernet cable to a powered device (PD) on the Ethernet network. The distribution of power over Ethernet cables, such that both power and data are distributed to devices on the network, allows for reduced costs of installation and reduced need for power conversion components and power cables, as well as a variety of other advantages.

FIG. 1 illustrates an example of a typical network 10 that provides power via PoE. The network 10 includes a first communication device 12 and a second communication device 14. For example, the first communication device 12 could be a data server and the second communication device 14 could be a wireless router. The first communication device 12 includes power sourcing equipment (PSE) 16 that is configured to provide power. For example, the PSE 16 can be a 48 volt DC power supply that can provide up to 350 milliamps (mA) of current. The PSE 16 can also include switching components that are configured to detect an impedance provided by an attached load, such that the provided power is only supplied upon detecting the impedance of the attached load.

The network 10 also includes a first data transformer 18, a second data transformer 20, a third data transformer 22, and a fourth data transformer 24 coupled to a first connector 26 of an Ethernet cable 28. The data transformers 18, 20, 22, and 24 provide signal isolation between a data bus 30 and the Ethernet cable 28. In the example of FIG. 1, the PSE 16 has a positive terminal that is coupled to a center tap of the secondary of the first data transformer 18 and a negative terminal that is coupled to a center tap of the secondary of the second data transformer 20. As described in greater detail below, it is to be understood that the PSE 16 is not limited to being coupled to the first and second data transformers 18 and 20, but both the positive terminal and the negative terminal of the PSE 16 could instead be coupled to any two of the data transformers 18, 20, 22, and 24.

The data provided to and from the data bus 30 travels across the Ethernet cable 28 via four sets of wire pairs 32 between the first connector 26 and a second connector 34 that is coupled to the second communication device 14. In the example of FIG. 1, the wire pairs 32 are depicted as twisted data lines, such as can be typical in a given Ethernet cable. In addition, as demonstrated in the example of FIG. 1, the power provided by the PSE 16 also travels across the Ethernet cable 28 via two sets of the wire pairs 32, with a current supply path between the terminals 1 and 2 of the connectors 26 and 34 and a current return path between terminals 3 and 6 of the connectors 26 and 34. The second communication device 14 includes a first data transformer 36, a second data transformer 38, a third data transformer 40, and a fourth data transformer 42. The data transformers 36, 38, 40, and 42 provide signal isolation between a data bus 44 and the Ethernet cable 28, such that data is transferred between the first communication device 12 and the second communication device 14 via the data buses 30 and 44. It is to be understood that the network 10 in the example of FIG. 1 is not intended to be limited to having all four of the data transformers 18, 20, 22, and 24, and all four of the data transformers 36, 38, 40, and 42. For example, the first communication device 12 and the second communication device 14 could instead include only two data transformers each, such that the data provided between the data buses 30 and 44 could propagate on only two of the four wire pairs 32, rendering the other two wire pairs 32 as spares. The PSE 16 could thus provide and receive current on the two wire pairs 32 that propagate the data, the spare wire pairs 32, or a combination thereof.

The second communication device 14 includes a powered device (PD) 46. The PD 46 is a load for the current provided by the PSE 16, such that the PD 46 can provide operating power for the second communication device 14. As an example, the PD 46 can include one or more components that provide an indication to the PSE 16 that it is coupled and ready to consume power provided by the PSE 16, such that the PSE 16 can be switched-on in response, as described above. In addition, the PD 46 can include or can be coupled to a DC/DC converter (not shown) that can convert the 48 VDC power provided by the PSE 16 to a lesser voltage for use by the second communication device 14. A capacitor 47 decouples the input power terminals of the PD 46.

The second communication device 14 also includes a first diode bridge 48 and a second diode bridge 50. The first diode bridge 48 can be fabricated on a first semiconductor die 52 and the second diode bridge 50 can be fabricated on a second semiconductor die 54. The first diode bridge 48 is coupled to the center taps of the first and second data transformers 36 and 38, as well as a positive input power terminal of the PD 46 at a node 56 and a negative input power terminal of the PD 46 at a node 58. As such, the supply current from the PSE 16 flows through the first diode bridge 48 to the PD 46, and the return current from the PD 46 flows through the first diode bridge 48 to the PSE 16. However, it is to be understood that the first diode bridge 48 is configured such that it is polarity insensitive. Specifically, the PD 46 can receive the supply current even if the polarity of the PSE 16 is switched, such that the supply current and the return current each flow through different wire pairs 32 without an effect on the PD 46 receiving the supply current. In a similar manner, the second diode bridge 50 is coupled to the center taps of the third and fourth data transformers 40 and 42, as well as a positive input power terminal of the PD 46 at the node 56 and a negative input power terminal of the PD 46 at the node 58. The second diode bridge 50 is likewise polarity insensitive. As a result, the positive terminal and the negative terminal of the PSE 16 can each be coupled to any two of the data transformers 18, 20, 22, and 24 and still provide the supply current to the positive input power terminal of the PD 46.

Due to constraints imposed on the wire pairs 32 as set by relevant PoE standards, each conductor of a given one of the wire pairs 32 is allowed to conduct a maximum amount of current. For example, as dictated by the 802.3af PoE standard, a given one of the wire pairs 32 is allowed to conduct up to approximately 175 mA of current, such that the PSE 16 is capable of supplying a maximum current of approximately 350 mA. An additional current of approximately 10.5 mA may also be present on a given conductor for current balancing between the two conductors of a given wire pair. However, as networks become more complex and PoE applications become more prevalent, communication devices that are configured to receive power via PoE may require additional current. As described above, a given set of wire pairs 32 may be limited in the amount of current they can provide, and thus cannot be configured to provide more current.

One solution could be to add an additional PSE, such as at the third and fourth data transformers 22 and 24 in the example of FIG. 1. However, a single load, such as the PD 46 in the example of FIG. 1, would draw current non-uniformly through each of the diode bridges 48 and 50 due to variations caused by a negative temperature coefficient inherent to the operation of diodes. As a result, substantially all of the current would be drawn from one of the two diode bridges 48 and 50 by the PD 46, causing overheating of wires, data transformers, and/or other components, as well as causing the current output of the PSE 16 to trip off. Accordingly, an additional PD 46 may be required to provide an increased amount of power to the second communication device 14. However, the addition of another PD 46 necessitates an additional DC/DC converter along with current sharing circuitry, which results in an increase in cost and circuit complexity of the second communication device 14.

SUMMARY

One embodiment of the present invention includes a communication network that comprises a communication cable having a first wire pair and a second wire pair that both extend between a first end and a second end of the communication cable. The network also comprises at least one power source configured to provide a first supply current through the first wire pair and a second supply current through the second wire pair at the first end of the communication cable. The first supply current and the second supply current can be substantially equal. The network also comprises a first diode bridge and a second diode bridge coupled to the second end of the communication cable and configured to combine the first and second supply currents to provide a combined supply current. The network further comprises a powered device configured to receive the combined supply current.

Another embodiment of the present invention includes an Ethernet communication system. The system comprises a first communication device having a first power source configured to provide a first supply current and to receive a first return current. The system also comprises a second power source configured to provide a second supply current and to receive a second return current. The system also comprises an Ethernet cable coupled to the first communication device at a first end. The Ethernet cable can be configured to conduct the first supply current through a first pair of wires, the second supply current through a second pair of wires, the first return current though a third pair of wires, and the second return current through a fourth pair of wires. The first supply current and the second supply current can be substantially equal and the first return current and the second return current can be substantially equal. The system also comprises a second communication device coupled to a second end of the Ethernet cable. The second communication device comprises a powered device configured to receive a combined supply current and to provide a combined return current. The second communication device also comprises a first diode bridge and a second diode bridge configured to receive and combine the first and second supply currents to provide the combined supply current to the powered device and to receive and divide the combined return current from the powered device into the first return current and the second return current.

Another embodiment of the present invention includes an Ethernet communication network. The network comprises means for providing a first supply current over a first wire pair of an Ethernet cable and means for providing a second supply current over a second wire pair of the Ethernet cable. The first supply current can be substantially equal to the second supply current. The network also comprises means for combining the first supply current and the second supply current received from the first wire pair and the second wire pair to provide a combined current, and means for receiving the combined current.

DETAILED DESCRIPTION

The present invention relates to electronic circuits, and more specifically to diode bridge configurations for increasing current in a distributed power network, such as for power-over-Ethernet (PoE). In a first communication device, two separate current supplies are provided, such as from two separate power source equipment (PSE) devices, such that a supply current is provided across the Ethernet cable to a second communication device via two of four data transformers, and a return current is received from the second communication device via the other two data transformers. In the second communication device, the two diode bridges can be configured to receive the two separate supply currents via PoE in a manner that the two separate supply currents are substantially balanced (i.e., equal), such that they are combined to generate a third current that is received by a single powered device (PD), the third current being a sum of the two separate supply currents. Because the two separate supply currents are substantially equal prior to being combined to generate the third supply current, each of the wire pairs can conduct a maximum current as dictated by the PoE standard without causing distortion or attenuation of data signals transmitted across the given Ethernet cable between the first communication device and the second communication device.

Figure 2:
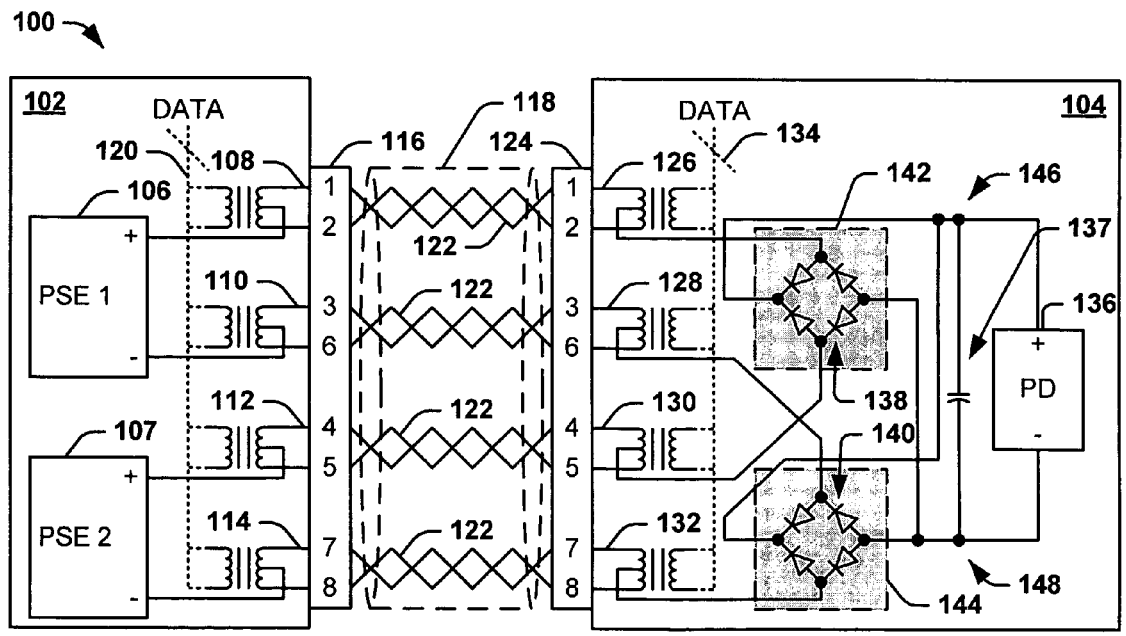
FIG. 2 illustrates an example of a network that provides power via PoE in accordance with an aspect of the invention.

FIG. 2 illustrates an example of a network 100 that provides power via PoE in accordance with an aspect of the invention. The network 100 includes a first communication device 102 and a second communication device 104. For example, the first communication device 102 could be a data server and the second communication device 104 could be a wireless router. The first communication device 102 includes a first PSE 106 and a second PSE 107 that are each configured to provide power. For example, each of the first PSE 106 and the second PSE 107 can be 48 volt DC power supplies that can each provide up to 350 milliamps (mA) of current, such that the first communication device may provide up to 700 mA of current via PoE. Each of the first PSE 106 and the second PSE 107 can also include switching components that are configured to detect an impedance provided by an attached load, such that the provided power is only supplied upon detecting the impedance of the attached load.

The network 100 also includes a first data transformer 108, a second data transformer 110, a third data transformer 112, and a fourth data transformer 114 coupled to a first connector 116 of an Ethernet cable 118. The data transformers 108, 110, 112, and 114 provide signal isolation between a data bus 120 and the Ethernet cable 118. In the example of FIG. 2, the first PSE 106 has a positive terminal that is coupled to a center tap of the secondary of the first data transformer 108 and a negative terminal that is coupled to a center tap of the secondary of the second data transformer 110. The second PSE 107 has a positive terminal that is coupled to a center tap of the secondary of the third data transformer 112 and a negative terminal that is coupled to a center tap of the secondary of the fourth data transformer 114.

The data provided to and from the data bus 120 travels across the Ethernet cable 118 via four sets of wire pairs 122 between the first connector 116 and a second connector 124 that is coupled to the second communication device 104. In the example of FIG. 2, the wire pairs 122 are depicted as twisted data lines, such as can be typical in a given Ethernet cable. As demonstrated in the example of FIG. 2, the power provided by the first PSE 106 also travels across the Ethernet cable 118 via two sets of the wire pairs 122, with a current supply path between the terminals 1 and 2 of the connectors 116 and 124 and a current return path between terminals 3 and 6 of the connectors 116 and 124. In addition, the power provided by the second PSE 108 also travels across the Ethernet cable 118 via two sets of the wire pairs 122, with a current supply path between the terminals 4 and 5 of the connectors 116 and 124 and a current return path between terminals 7 and 8 of the connectors 116 and 124. The second communication device 104 includes a first data transformer 126, a second data transformer 128, a third data transformer 130, and a fourth data transformer 132. The data transformers 126, 128, 130, and 132 provide signal isolation between a data bus 134 and the Ethernet cable 118, such that data is transferred between the first communication device 102 and the second communication device 104 via the data buses 120 and 134.

It is to be understood that the network 50 in the example of FIG. 2 is not intended to be limited to having all four of the data transformers 108, 110, 112, and 114, and all four of the data transformers 126, 128, 130, and 132. For example, the first communication device 102 and the second communication device 104 could instead include only two data transformers each, such that the data provided between the data buses 120 and 134 could propagate on only two of the four wire pairs 122, rendering the other two wire pairs 122 as spares. In addition, in the example of two of the wire pairs 122 being configured as spares, it is to be understood that one of the first PSE 106 and the second PSE 107 could be coupled as a midspan PSE. For example, the network 50 can be configured such that one of the first PSE 106 and the second PSE 107 can be interconnected as a midspan PSE between the first communication device 102 and the second communication device 104, such that it is configured separately from the first communication device 102. As such, the midspan PSE can be configured to provide and receive the respective supply and return currents via the spare wire pairs 122 at the midspan location.

The second communication device 104 includes a PD 136. The PD 136 is a load for the current provided by both the first PSE 106 and the second PSE 107, such that the PD 136 can provide operating power for the second communication device 104. As an example, the PD 136 can include one or more components that provide an indication to the first PSE 106 and the second PSE 107 that it is coupled and ready to consume power, such that both the first PSE 106 and the second PSE 107 can be switched-on in response, as described above. In addition, the PD 136 can include or can be coupled to a DC/DC converter (not shown) that can convert the 48 VDC power provided by the first PSE 106 and the second PSE 107 to a lesser voltage for use by the second communication device 104. A capacitor 137 decouples the input power terminals of the PD 136.

The second communication device 104 also includes a first diode bridge 138 and a second diode bridge 140. The first diode bridge 138 can be fabricated on a first semiconductor die 142 and the second diode bridge 140 can be fabricated on a second semiconductor die 144. The first diode bridge 138 is coupled to the center taps of the first and third data transformers 126 and 130, as well as a positive input power terminal of the PD 136 at a node 146 and a negative input power terminal of the PD 136 at a node 148. As such, the supply current from both the first PSE 106 and the second PSE 107 flows through the first diode bridge 138 to the PD 136. Therefore, the first diode bridge 138 includes a pair of current supply path diodes, one for each of the supply current from the first PSE 106 and the supply current from the second PSE 107. At the output of the pair of current supply path diodes of the first diode bridge 138 (i.e., the node 146), the supply current from the first PSE 106 and the supply current from the second PSE 107 are added together to generate a third current that is provided to a positive input power terminal of the PD 136.

The second diode bridge 140 is coupled to the center taps of the second and fourth data transformers 128 and 132, as well as a positive input power terminal of the PD 136 at the node 146 and a negative input power terminal of the PD 136 at the node 148. The return current from the PD 136 is divided into the return current for the first PSE 106 and the return current for the second PSE 107 at the node 148. The return current for the first PSE 106 and the return current for the second PSE 107 then flows through a pair of current return path diodes in the second diode bridge 140 to the first PSE 106 and the second PSE 107, respectively.

The configuration of the second communication device 104 allows the supply current provided by the first PSE 106 and the second PSE 107 to flow substantially equally through the first diode bridge 138. Specifically, because the first diode bridge 138 is fabricated on a single semiconductor die, the diodes that constitute the first diode bridge 138 have matched operating characteristics with respect to process and temperature variations. Therefore, each of the diodes of the diode pair through which the supply current provided by the first PSE 106 and the second PSE 107 flows is affected substantially identically by process and temperature variations. Accordingly, the supply current provided by each of the first PSE 106 and the second PSE 107 flows substantially equally through the first diode bridge 138, thus allowing a maximum current flow through two sets of the wire pairs 122 without saturating any of the data transformers and causing unwanted signal attenuation or distortion. In a similar manner, because each of the diodes of the diode pair through which the return current for the first PSE 106 and the second PSE 107 flows is fabricated on the same semiconductor die 144, the return current flow from the PD 136 to each of the first PSE 106 and the second PSE 107 is substantially the same, as well.

Figure 1:
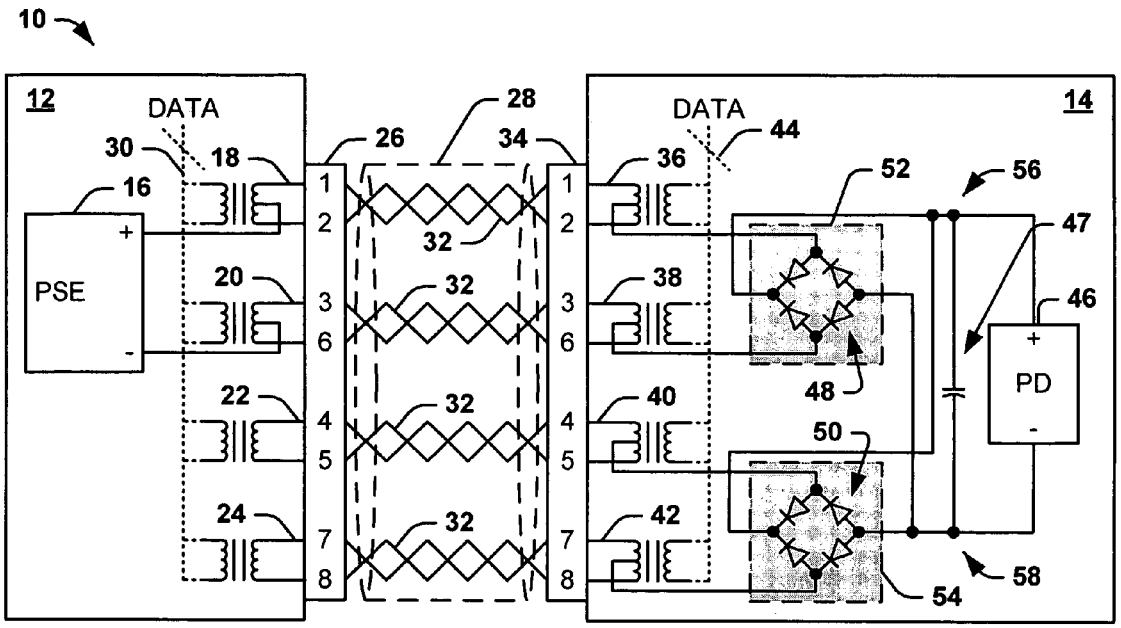
FIG. 1 illustrates an example of a prior art network that provides power via power over Ethernet (PoE).

It is to be understood that, unlike the above described typical network 10 described in the example of FIG. 1, the configuration of the first diode bridge 138 and the second diode bridge 140 in the example of FIG. 2 is not polarity insensitive. Specifically, the positive terminals and the negative terminals of the first PSE 106 and the second PSE 107 cannot be coupled in any manner to the data transformers 108, 110, 112, and 114 and still provide the maximum supply current of each of the first PSE 106 and the second PSE 107 to the positive input power terminal of the PD 136. However, a typical diode bridge may be readily commercially available in a single semiconductor die with a pair of current supply path diodes and a pair of current return path diodes, such as demonstrated in the above example of FIG. 1. Therefore, the second communication device 104 in the example of FIG. 2 can be implemented with standard commercially available components, such as the first diode bridge 138 and the second diode bridge 140.

It is to be understood that the example of FIG. 2 is but one example of a network that provides power via PoE. As such, any of a variety of modifications can be implemented to provide power over an Ethernet cable from one communication device to another. In addition, a number of components are not demonstrated in the example of FIG. 2 for the sake of simplicity, such as the devices configured to generate and receive the data to and from the data buses 120 and 134. Furthermore, despite the discussion of the example of FIG. 2 being specific to Ethernet communications, the network 100 in the example of FIG. 2 could be implemented in any of a variety of communication networks other than Ethernet. Accordingly, the network 100 is not intended to be limited to the example of FIG. 2.

Figure 3:
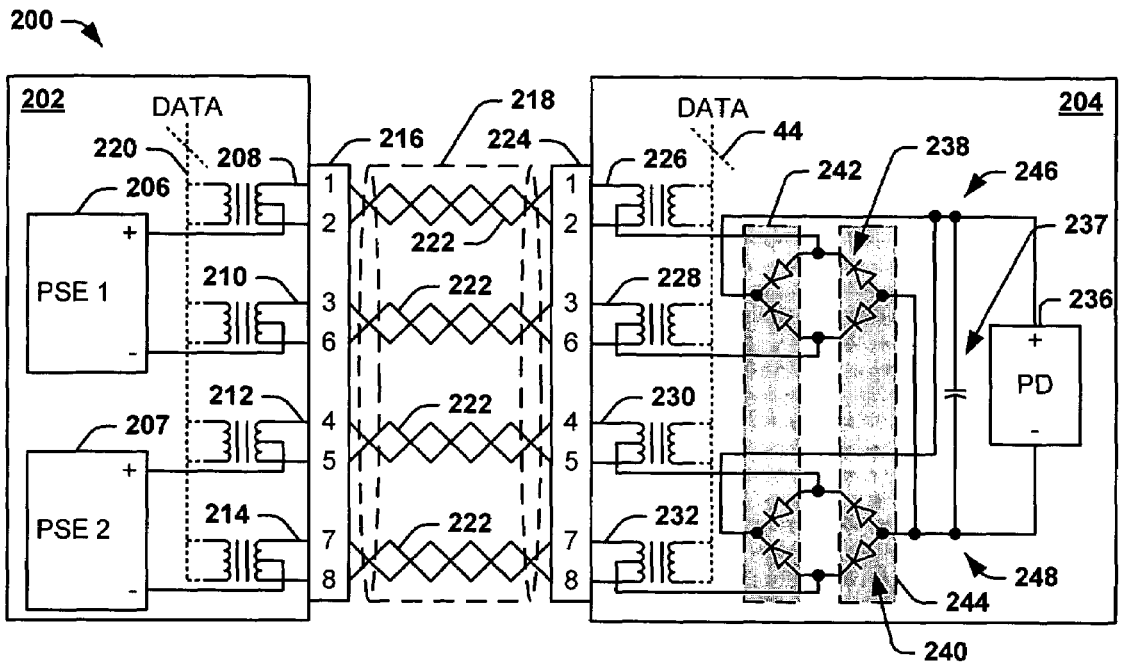
FIG. 3 illustrates another example of a network that provides power via PoE in accordance with an aspect of the invention.

FIG. 3 illustrates another example of a network 200 that provides power via PoE in accordance with an aspect of the invention. The network 200 includes a first communication device 202 and a second communication device 204. Similar to as described above in the example of FIG. 2, the first communication device 202 includes a first PSE 206 and a second PSE 207 that are each configured to provide power (e.g., approximately 700 mA total). Also similar to as described above in the example of FIG. 2, the network 200 includes data transformers 208, 210, 212, and 214 coupled to a first connector 216 of an Ethernet cable 218.

The data provided to and from a data bus 220 travels across the Ethernet cable 218 via four sets of wire pairs 222 between a first connector 216 and a second connector 224 that is coupled to the second communication device 204. In the example of FIG. 3, the wire pairs 222 are depicted as twisted data lines, such as can be typical in a given Ethernet cable. As demonstrated in the example of FIG. 3, the power provided by the first PSE 206 travels across the Ethernet cable 218 via two sets of the wire pairs 222, with a current supply path between the terminals 1 and 2 of the connectors 216 and 224 and a current return path between terminals 3 and 6 of the connectors 216 and 224. In addition, the power provided by the second PSE 208 also travels across the Ethernet cable 218 via two sets of the wire pairs 222, with a current supply path between the terminals 4 and 5 of the connectors 216 and 224 and a current return path between terminals 7 and 8 of the connectors 216 and 224. The second communication device 204 includes data transformers 226, 228, 230, and 232, similar to as described above in the example of FIG. 2. In addition, similar to as described above, the network 200 can be configured such that two of the wire pairs 222 are spares. As such, the network 200 can also be configured such that one of the first PSE 206 and the second PSE 207 is configured as a midspan PSE that provides and receives the respective supply and return currents via the spare wire pairs 222 at the midspan location.

The second communication device 204 includes a PD 236. The PD 236 is a load for the current provided by both the first PSE 206 and the second PSE 207, such that the PD 236 can provide operating power for the second communication device 204. In addition, the PD 236 can include or can be coupled to a DC/DC converter (not shown) that can convert 48 VDC power provided by the first PSE 206 and the second PSE 207 to a lesser voltage for use by the second communication device 204. A capacitor 237 decouples the input power terminals of the PD 236.

The second communication device 204 also includes a first diode bridge 238 and a second diode bridge 240. Similar to the above described examples of FIGS. 1 and 2, each of the first diode bridge 238 and the second diode bridge 240 include both a current supply path diode pair and a current return path diode pair. However, in the example of FIG. 3, the current supply path diode pair of each of the first diode bridge 238 and the second diode bridge 240 are fabricated on a first semiconductor die 242, and the current return path diode pair of each of the first diode bridge 238 and the second diode bridge 240 are fabricated on a second semiconductor die 244.

The first diode bridge 238 is coupled to the center taps of the first and second data transformers 226 and 228, as well as a positive input power terminal of the PD 236 at a node 246 and a negative input power terminal of the PD 236 at a node 248. The second diode bridge 240 is coupled to the center taps of the third and fourth data transformers 230 and 232, as well as a positive input power terminal of the PD 236 at the node 246 and a negative input power terminal of the PD 236 at the node 248. As such, as demonstrated in the example of FIG. 3, the supply current from the first PSE 206 flows through one of the pair of current supply path diodes in the first diode bridge 238, and the supply current from the second PSE 207 flows through one of the pair of current supply path diodes in the second diode bridge 240. A third supply current that is a sum of the supply current from the first PSE 206 and the supply current from the second PSE 207 is generated at the node 246 and input to the positive input power terminal of the PD 236.

The return current from the PD 236 is divided into the return current for the first PSE 206 and the return current for the second PSE 207 at the node 248. Therefore, similar to as described above regarding the supply current, the return current for the first PSE 206 flows through one of the pair of current return path diodes in the first diode bridge 238, and the return current for the second PSE 207 flows through one of the pair of current return path diodes in the second diode bridge 240.

In the example of FIG. 3, the supply current provided by the first PSE 206 and the second PSE 207 flow substantially equally despite flowing through both the first diode bridge 238 and the second diode bridge 240, respectively. Specifically, because the current supply path diode pair of the first diode bridge 238 and the current supply path diode pair of the second diode bridge 240 are fabricated on a single semiconductor die (i.e., the semiconductor die 242), each of these diode pairs have matched operating characteristics with respect to process and temperature variations. Therefore, each of the diodes of the diode pair through which the current provided by the first PSE 206 and the second PSE 207 flows is affected substantially identically by process and temperature variations, regardless of each of the diodes of this diode pair being configured on a separate one of the first diode bridge 238 and the second diode bridge 240. Accordingly, the supply current provided by each of the first PSE 206 and the second PSE 207 flows substantially equally through this diode pair, thus allowing a maximum current flow through two sets of the wire pairs 222 without saturating any of the data transformers and causing unwanted signal attenuation or distortion. In a similar manner, because each of the diodes of the diode pair through which the return current for the first PSE 206 and the second PSE 207 flows is fabricated on the same semiconductor die 244, the return current flow from the PD 236 to each of the first PSE 206 and the second PSE 207 is substantially the same, as well.

In the example of FIG. 3, because the current supply path diode pairs of both the first diode bridge 238 and the second diode bridge 240 are fabricated on the same semiconductor die (i.e., the semiconductor die 242), and because the current return path diode pairs of both the first diode bridge 238 and the second diode bridge 240 are fabricated on the same semiconductor die (i.e., the semiconductor die 244), the second communication device 204 is configured to be polarity insensitive. Specifically, the positive terminals and the negative terminals of the first PSE 206 and the second PSE 207 can be coupled in any manner to the data transformers 208, 210, 212, and 214 and still provide the maximum supply current of each of the first PSE 206 and the second PSE 207 (e.g., approximately 700 mA) to the positive input power terminal of the PD 236.

It is to be understood that the example of FIG. 3 is but one example of a network that provides power via PoE. As such, any of a variety of modifications can be implemented to provide power over an Ethernet cable from one communication device to another. In addition, a number of network components are not demonstrated in the example of FIG. 3 for the sake of simplicity, such as the devices configured to generate and receive the data to and from the data buses 220 and 234. Furthermore, despite the discussion of the example of FIG. 3 being specific to Ethernet communications, the network 200 in the example of FIG. 3 could be implemented in any of a variety of communication networks other than Ethernet. Accordingly, the network 200 is not intended to be limited to the example of FIG. 3.

Figure 4:
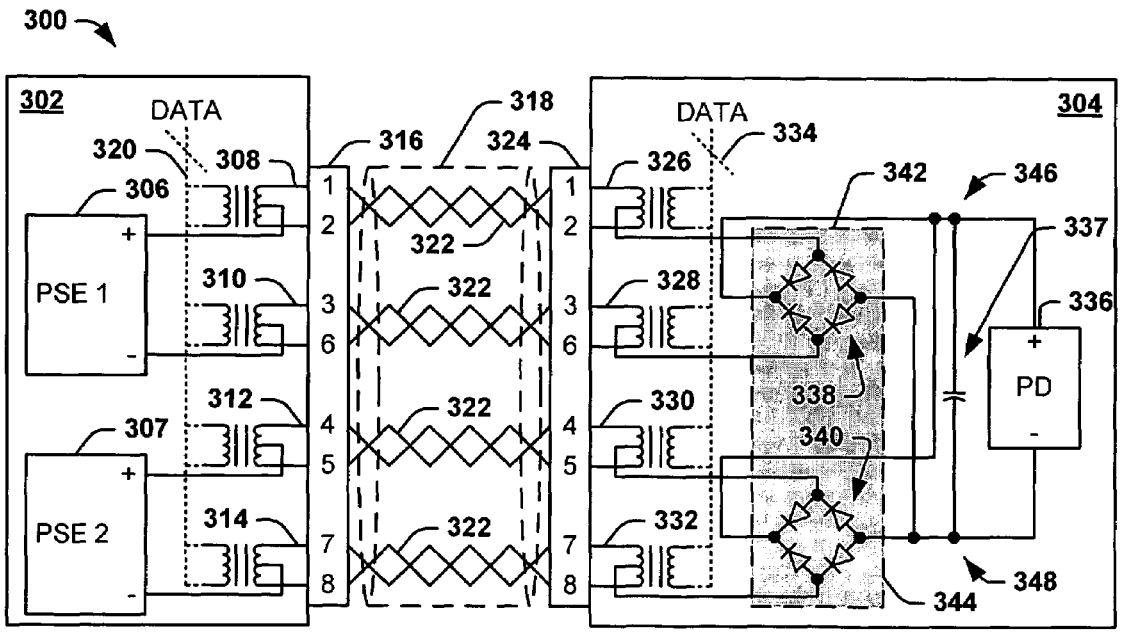
FIG. 4 illustrates another example of a network that provides power via PoE in accordance with an aspect of the invention.

FIG. 4 illustrates another example of a network 300 that provides power via PoE in accordance with an aspect of the invention. The network 300 includes a first communication device 302 and a second communication device 304. Similar, to as described above in the examples of FIGS. 2 and 3, the first communication device 302 includes a first PSE 306 and a second PSE 307 that are each configured to provide power (e.g., approximately 700 mA total). Also similar to as described above in the examples of FIGS. 2 and 3, the network 300 includes data transformers 308, 310, 312, and 314 coupled to a first connector 316 of an Ethernet cable 318.

The data provided to and from a data bus 320 travels across the Ethernet cable 318 via four sets of wire pairs 322 between a first connector 316 and a second connector 324 that is coupled to the second communication device 304. In the example of FIG. 4, the wire pairs 322 are depicted as twisted data lines, such as can be typical in a given Ethernet cable. As demonstrated in the example of FIG. 4, the power provided by the first PSE 306 travels across the Ethernet cable 318 via two sets of the wire pairs 322, with a current supply path between the terminals 1 and 2 of the connectors 316 and 324 and a current return path between terminals 3 and 6 of the connectors 316 and 324. In addition, the power provided by the second PSE 308 also travels across the Ethernet cable 318 via two sets of the wire pairs 322, with a current supply path between the terminals 4 and 5 of the connectors 316 and 324 and a current return path between terminals 7 and 8 of the connectors 316 and 324. The second communication device 304 includes data transformers 326, 328, 330, and 332, similar to as described above in the examples of FIGS. 2 and 3. In addition, similar to as described above, the network 300 can be configured such that two of the wire pairs 322 are spares. As such, the network 300 can also be configured such that one of the first PSE 306 and the second PSE 307 is configured as a midspan PSE that provides and receives the respective supply and return currents via the spare wire pairs 322 at the midspan location.

The second communication device 304 includes a PD 336. The PD 336 is a load for the current provided by both the first PSE 306 and the second PSE 307, such that the PD 336 can provide operating power for the second communication device 304. In addition, the PD 336 can include or can be coupled to a DC/DC converter (not shown) that can convert 48 VDC power provided by the first PSE 306 and the second PSE 307 to a lesser voltage for use by the second communication device 304. A capacitor 337 decouples the input power terminals of the PD 336.

The second communication device 304 also includes a first diode bridge 338 and a second diode bridge 340. In the example of FIG. 4, both the first diode bridge 338 and the second diode bridge 340 are fabricated on a common semiconductor die 342. Similar to as described above regarding the example of FIG. 3, the first diode bridge 338 is coupled to the center taps of the first and second data transformers 326 and 328, and the second diode bridge 340 is coupled to the center taps of the third and fourth data transformers 330 and 332. Both of the first diode bridge 338 and the second diode bridge 340 are coupled to a positive input power terminal of the PD 336 at a node 346 and a negative input power terminal of the PD 336 at a node 348.

The supply current from the first PSE 306 flows through the first diode bridge 338, and the supply current from the second PSE 307 flows through the second diode bridge 340. A third supply current that is a sum of the supply current from the first PSE 306 and the supply current from the second PSE 307 is generated at the node 346 and input to the positive input power terminal of the PD 336. The return current from the PD 336 is divided into the return current for the first PSE 306 and the return current for the second PSE 307 at the node 348. Therefore, similar to as described above regarding the supply current, the return current for the first PSE 306 flows through one of the pair of current return path diodes in the first diode bridge 338, and the return current for the second PSE 307 flows through one of the pair of current return path diodes in the second diode bridge 340.

Similar to as described above in the examples of FIGS. 2 and 3, the configuration of the second communication device 304 allows the supply current provided by the first PSE 306 and the second PSE 307 to flow substantially equally. Specifically, because both the first diode bridge 338 and the second diode bridge 340 are fabricated on the common semiconductor die 342, all of the diodes have matched operating characteristics and are thus affected substantially identically by process and temperature variations. Accordingly, both the supply current and the return current of each of the first PSE 306 and the second PSE 307 flows substantially equally through the first diode bridge 338 and/or the second diode bridge 340, thus allowing a maximum current flow through two sets of the wire pairs 322 without saturating any of the data transformers and causing unwanted signal attenuation or distortion. In addition, in the example of FIG. 4, because both the first diode bridge 338 and the second diode bridge 340 are fabricated on the common semiconductor die 342, the second communication device 304 is configured to be polarity insensitive. Specifically, the positive terminals and the negative terminals of the first PSE 306 and the second PSE 307 can be separately coupled in any manner to the data transformers 308, 310, 312, and 314 and still provide the maximum supply current of each of the first PSE 306 and the second PSE 307 (e.g., approximately 700 mA) to the positive input power terminal of the PD 336.

It is to be understood that the example of FIG. 4 is but one example of a network that provides power via PoE. As such, any of a variety of modifications can be implemented to provide power over an Ethernet cable from one communication device to another. In addition, a number of network components are not demonstrated in the example of FIG. 4 for the sake of simplicity, such as the devices configured to generate and receive the data to and from the data buses 320 and 334. Furthermore, despite the discussion of the example of FIG. 4 being specific to Ethernet communications, the network 300 in the example of FIG. 4 could be implemented in any of a variety of communication networks other than Ethernet. Accordingly, the network 300 is not intended to be limited to the example of FIG. 4.

Figure 5:
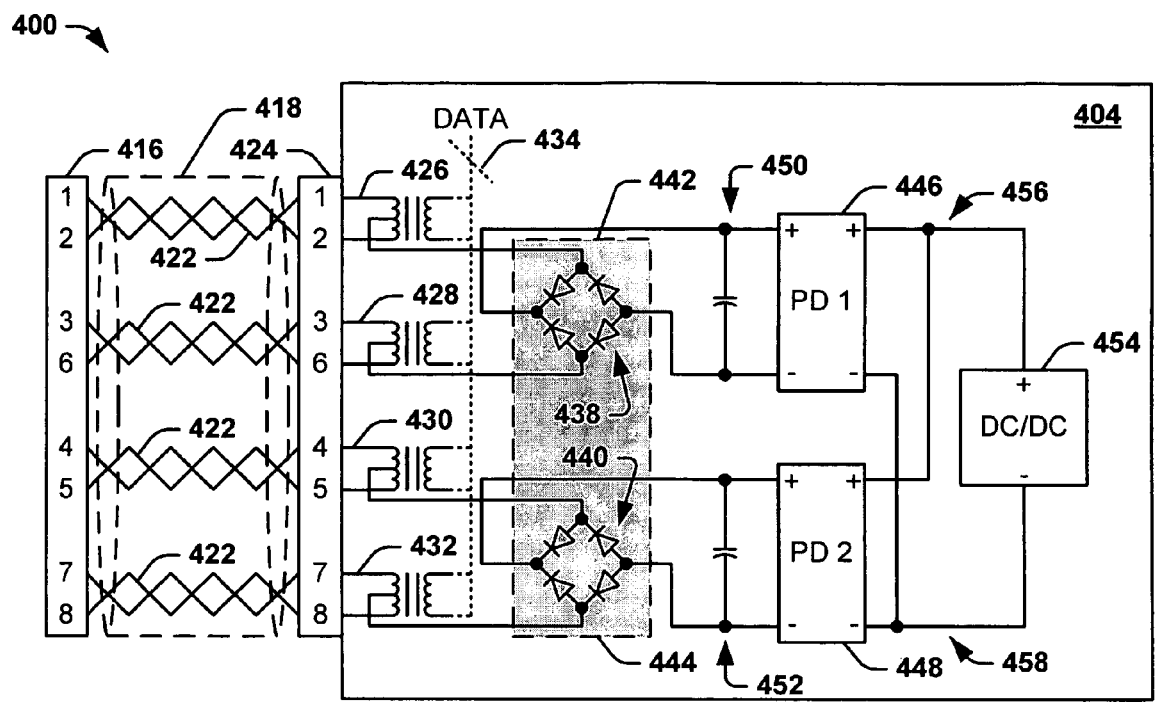
FIG. 5 illustrates another example of a network that provides power via PoE in accordance with an aspect of the invention.

FIG. 5 illustrates another example of a network 400 that provides power via PoE in accordance with an aspect of the invention. The network 400 includes a first communication device (not shown) that can be configured substantially the same as the first communication devices 102, 202, and 302 depicted, respectively, in the examples of FIGS. 2-4. The network 400 also includes a second communication device 404. Similar, to as described above in the examples of FIGS. 2-4, the first communication device can include both a first PSE and a second PSE that are each configured to provide power (e.g., approximately 700 mA total). Also similar to as described above in the examples of FIGS. 2-4, an Ethernet cable 418 having four sets of wire pairs 422 interconnects a first connector 416, coupled to the first communication device, and a second connector 424. The second communication device includes data transformers 426, 428, 430, and 432 coupled to a data bus 434, as well as a first diode bridge 438 and a second diode bridge 440 fabricated on the same semiconductor die 442, similar to as described above regarding the example of FIG. 4.

In the example of FIG. 5, the second communication device 404 includes a first PD 446 and a second PD 448. The first PD 446 and the second PD 448 can be configured on the same integrated circuit (IC), or can be configured individually. Each of the first PD 446 and the second PD 448 can provide an impedance that can be detected by the respective first PSE and second PSE, such that the first and second PSE each provide power in response to the detected impedance. A capacitor 450 decouples the input power terminals of the first PD 446, and a capacitor 452 decouples the input power terminals of the second PD 448.

The first PD 446 is coupled to the first diode bridge 438, such that the supply current and the return current associated with the first PSE flows between the first PSE and the first PD 446 through the first diode bridge 438. Similarly, the second PD 448 is coupled to the second diode bridge 440, such that the supply current and the return current associated with the second PSE flows between the second PSE and the second PD 448 through the second diode bridge 440. Accordingly, the first PD 446 and the second PD 448 can each receive substantially equal supply currents and can provide substantially equal return currents.

Each of the first PD 446 and the second PD 448 provide current to a DC/DC converter 454. In the example of FIG. 5, a supply current provided from the first PD 446 and the second PD 448 is combined at a node 456 and input to a positive input power terminal of the DC/DC converter 454. Likewise, a return current is provided from the negative input power terminal of the DC/DC converter 454 and is split at a node 458 and provided, respectively, to the first PD 446 and the second PD 448.

The DC/DC converter 454 can be configured to convert the 48 VDC power provided by the first PSE and the second PSE via the first PD 446 and the second PD 448 to a lesser voltage for use by the second communication device 404. However, as described above, because the first diode bridge 438 and the second diode bridge 440 are fabricated on the same semiconductor die 442, the first PD 446 and the second PD 448 can each receive substantially equal supply currents and can provide substantially equal return currents. Thus, the second communication device 404 is configured such that the DC/DC converter 454 receives a current that is substantially twice the supply current provided from each of the first PSE and the second PSE individually. Therefore, because the current provided by the first PD 446 and the second PD 448 to the DC/DC converter is substantially balanced, the DC/DC converter 454 can be implemented individually, as opposed to the second communication device 404 including a separate DC/DC converter for each of the first PD 446 and the second PD 448, respectively, along with current sharing circuitry. Accordingly, the second communication device 404 in the example of FIG. 5 is configured in a manner that substantially reduces cost and circuit complexity.

It is to be understood that the example of FIG. 5 is but one example of a network that provides power via PoE. As such, any of a variety of modifications can be implemented to provide power over an Ethernet cable from one communication device to another. In addition, a number of network components are not demonstrated in the example of FIG. 5 for the sake of simplicity, such as the devices configured to generate and receive the data to and from the data bus 434. Furthermore, despite the discussion of the example of FIG. 5 being specific to Ethernet communications, the network 400 in the example of FIG. 5 could be implemented in any of a variety of communication networks other than Ethernet. Accordingly, the network 400 is not intended to be limited to the example of FIG. 5.

It is also to be understood that the networks demonstrated in the examples of FIGS. 2-5 can be combined in any of a variety of manners in accordance with an aspect of the invention. For example, the connection of the first diode bridge 138 to the first and third data transformers 126 and 130 and the connection of the second diode bridge 140 to the second and fourth data transformers 128 and 132, as demonstrated in the network 100 in the example of FIG. 2, could be implemented in either or both of the networks 200 or 300 in the examples of FIGS. 3 and 4. As another example, the arrangement of the first diode bridge 238 and the second diode bridge 240 fabricated on the first die 242 and the second die 244 could be implemented in the network 400 of the example of FIG. 5. As such, the current supply path diode pair of both the first diode bridge 438 and the second diode bridge 440 can be fabricated on one die and the current return path diode pair of both the first diode bridge 438 and the second diode bridge 440 can be fabricated on another, separate die. Accordingly, the networks in the examples of FIGS. 2-5 can be implemented in any of a variety of different ways.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A communication network comprising:
   a communication cable having a first wire pair and a second wire pair that both extend between a first end and a second end of the communication cable;
   at least one power source configured to provide a first supply current through the first wire pair and a second supply current through the second wire pair at the first end of the communication cable, the first supply current being substantially equal to the second supply current;
   a first integrated circuit having first and second pairs of diodes, each pair having their respective cathodes connected together, a second integrated circuit having third and fourth pairs of diodes, each pair having their respective anodes connected together, wherein the first and third diode pairs form a first diode bridge and the second and fourth a second diode pairs form a second diode bridge coupled to the second end of the communication cable and configured to combine the first and second supply currents to provide a combined supply current, wherein the first supply current and the second supply current each flow in a first direction through the first diode bridge and in a second direction through the second diode bridge, whereby the first supply current and the second supply current each provide a substantially equal share of the combined supply current; and
   a powered device configured to receive the combined supply current.

2. The network of claim 1, wherein the first diode bridge is configured to receive the first supply current at a first diode and the second supply current at a second diode and to provide the combined current at a common output node of the first and second diodes.

3. The network of claim 1, wherein the communication cable further comprises a third wire pair and a fourth wire pair that both extend between the first end and the second end of the communication cable wherein the second diode bridge is further configured to receive a combined return current from the powered device and provide a first return current through the third wire pair and a second return current through the fourth wire pair to the at least one power source.

4. The network of claim 1, wherein the first diode bridge comprises a first pair of current supply path diodes and a first pair of current return path diodes, and wherein the second diode bridge comprises a second pair of current supply path diodes and a second pair of current return path diodes.

5. The network of claim 4, wherein the first diode bridge is configured to pass the first supply current through one of the first pair of current supply path diodes and the second supply current through the other of the first pair of current supply path diodes, and wherein the second diode bridge is configured to pass the first return current through one of the second pair of current return path diodes and the second return current through an other of the second pair of current return path diodes.

6. The network of claim 5, wherein the first pair of current supply path diodes and the first pair of current return path diodes are fabricated on a first semiconductor die, and wherein the second pair of current supply path diodes and the second pair of current return path diodes are fabricated on a second semiconductor die.

7. The network of claim 4, wherein the first pair of current supply path diodes and the second pair of current supply path diodes are fabricated on a first semiconductor die, and wherein the first pair of current return path diodes and the second pair of current return path diodes are fabricated on a second semiconductor die.

8. The network of claim 1, wherein the first diode bridge and the second diode bridge are fabricated on a same semiconductor die.

9. The network of claim 1, wherein the at least one power source resides on a first communication device and the first diode bridge, the second diode bridge, and the powered device reside on a second communication device.

10. An Ethernet communication system comprising:
    a first communication device having a first power source configured to provide a first supply current and to receive a first return current;
    a second power source configured to provide a second supply current and to receive a second return current;
    an Ethernet cable coupled to the first communication device at a first end, the Ethernet cable being configured to conduct the first supply current through a first pair of wires, the second supply current through a second pair of wires, the first return current though a third pair of wires, and the second return current through a fourth pair of wires, the first supply current and the second supply current being substantially equal and the first return current and the second return current being substantially equal; and
    a second communication device coupled to a second end of the Ethernet cable, the second communication device comprising:
    a powered device configured to receive a combined supply current and to provide a combined return current; and
    a first integrated circuit having first and second pairs of diodes, each pair having their respective cathodes connected together, a second integrated circuit having third and fourth pairs of diodes, each pair having their respective anodes connected together, wherein the first and third diode pairs form a first diode bridge and the second and fourth a second diode pairs form a second diode bridge configured to receive and combine the first and second supply currents to provide the combined supply current to the powered device and to receive and divide the combined return current from the powered device into the first return current and the second return current, herein the first supply current and the second supply current each flow in a first direction through the first diode bridge and in a second direction through the second diode bridge, whereby the first supply current and the second supply current each provide a substantially equal share of the combined supply current.

11. The system of claim 10, wherein the first diode bridge is configured to pass the first supply current through one of the first pair of current supply path diodes and the second supply current through the other of the first pair of current supply path diodes, and wherein the second diode bridge is configured to pass the first return current through one of the second pair of current return path diodes and the second return current through an other of the second pair of current return path diodes.

12. The system of claim 11, wherein the first pair of current supply path diodes and the first pair of current return path diodes are fabricated on a first semiconductor die, and wherein the second pair of current supply path diodes and the second pair of current return path diodes are fabricated on a second semiconductor die.

13. The system of claim 10, wherein the first pair of current supply path diodes and the second pair of current supply path diodes are fabricated on a first semiconductor die, and wherein the first pair of current return path diodes and the second pair of current return path diodes are fabricated on a second semiconductor die.

14. The system of claim 10, wherein the first diode bridge and the second diode bridge are fabricated on a same semiconductor die.

15. An Ethernet communication network comprising:
means for providing a first supply current over a first wire pair of an Ethernet cable;
means for providing a second supply current over a second wire pair of the Ethernet cable, the first supply current being capable of being substantially equal to the second supply current;
a first integrated circuit means having first and second pairs of diodes, each pair having their respective cathodes connected together, a second integrated circuit means having third and fourth pairs of diodes, each pair having their respective anodes connected together, wherein the first and third diode pairs form first diode bridge means and the second and fourth a second diode pairs form second diode bridge means for combining the first supply current and the second supply current received from the first wire pair and the second wire pair to provide a combined current, wherein the first supply current and the second supply current each flow in a first direction through the first diode bridge means and in a second direction through the second diode bridge means, whereby the first supply current and the second supply current each provide a substantially equal share of the combined supply current; and
means for receiving the combined current.

16. The network of claim 15, wherein the means for combining comprises a first means for passing the first supply current and a second means for passing the second supply current, the first means and the second means being fabricated on a same semiconductor die.

17. The network of claim 15, wherein the means for combining the first supply current and the second supply current is configured for dividing a combined return current from the means for receiving the combined current into a first return current and a second return current substantially equal to the first returned current, the first return current being provided over a third wire pair of the Ethernet cable to the means for providing the first supply current and the second return current being provided over a fourth wire pair of the Ethernet cable to the means for providing the second supply current.

18. The network of claim 17, wherein the means for combining comprises a first means for passing the first return current and a second means for passing the second return current, the first means and the second means being fabricated on a same semiconductor die.

19. An Ethernet communication network comprising:
an Ethernet cable interconnecting a first communication device at a first end and a second communication device at a second end, the Ethernet cable being configured to conduct a first supply current through a first pair of wires and a second supply current through a second pair of wires, the first supply current and the second supply current being capable of being substantially equal, the second communication device comprising:
a first integrated circuit having first and second pairs of diodes, each pair having their respective cathodes connected together, wherein the first and third diode pairs form a first diode bridge configured to pass the first supply current;
a first powered device coupled to the first diode bridge and configured to receive the first supply current and to provide a third supply current;
a second integrated circuit having third and fourth pairs of diodes, each pair having their respective anodes connected together, the second and fourth a second diode pairs form a second diode bridge configured to pass the second supply current;
a second powered device coupled to the second diode bridge and configured to receive the second supply current and to provide a fourth supply current; and
a DC/DC converter configured to receive a combined supply current that is a sum of the third supply current and the fourth supply current.

20. The network of claim 19, wherein the first diode bridge and the second diode bridge are fabricated on a same semiconductor die.

21. The network of claim 19, wherein the first diode bridge comprises a first pair of supply current path diodes and a first pair of current return path diodes, and wherein the second diode bridge comprises a second pair of supply current path diodes and a second pair of return current path diodes, the first and second pairs of current supply path diodes being fabricated on a first semiconductor die and the first and second pairs of current return path diodes being fabricated on a second semiconductor die.

22. An Ethernet communication system comprising:
a first communication device having a first power source configured to provide a first supply current and to receive a first return current;
a second power source configured to provide a second supply current and to receive a second return current;
an Ethernet cable coupled to the first communication device at a first end, the Ethernet cable being configured to conduct the first supply current through a first pair of wires, the second supply current through a second pair of wires, the first return current though a third pair of wires, and the second return current through a fourth pair of wires, the first supply current and the second supply current being capable of being substantially equal and the first return current and the second return current being capable of being substantially equal; and
a second communication device coupled to a second end of the Ethernet cable, the second communication device comprising:
a powered device configured to receive a combined supply current and to provide a combined return current; and
a first integrated circuit having first and second pairs of diodes, each pair having their respective cathodes connected together, a second integrated circuit having third and fourth pairs of diodes, each pair having their respective anodes connected together, wherein the first and third diode pairs form a first diode bridge and the second and fourth a second diode pairs form a second diode bridge configured to receive and combine the first and second supply currents to provide the combined supply current to the powered device and to receive and divide the combined return current from the powered device into the first return current and the second return current, wherein the first diode bridge comprises a first pair of diodes for conducting current flow in a first direction on a first semiconductor die and a second pair of diodes for conducting current flow in a second direction on a second semiconductor die, the second diode bridge comprising a first pair of diodes for conducting current flow in a first direction on the first semiconductor die and a second pair of diodes for conducting current flow in a second direction on the second semiconductor die whereby the first supply current and the second supply current each provide a substantially equal share of the combined supply current.

* * * * *